US006133868A

United States Patent [19]

Butler et al.

[11] Patent Number: 6,133,868

[45] Date of Patent: Oct. 17, 2000

[54] SYSTEM AND METHOD FOR FULLY SELF-CONTAINED CALIBRATION OF AN ANTENNA ARRAY

[75] Inventors: Ray K. Butler, Woodinville; Michael G. Melville; Curtis F. McClive, both of Redmond; J. Todd Elson, Seattle, all of Wash.

[73] Assignee: Metawave Communications Corporation, Redmond, Wash.

[21] Appl. No.: 09/092,429

[22] Filed: Jun. 5, 1998

[51] Int. Cl.[7] .................................................. G01S 7/40

[52] U.S. Cl. ......................... 342/174; 342/165; 342/173; 342/372

[58] Field of Search .................................... 342/165, 169, 342/170, 171, 172, 173, 174, 175, 195, 368, 371, 372

[56] References Cited

U.S. PATENT DOCUMENTS

| | | | |
|---|---|---|---|
| 4,176,354 | 11/1979 | Hsiao et al. . | |
| 4,532,518 | 7/1985 | Gaglione et al. . | |
| 5,315,304 | 5/1994 | Ghaleb et al. | 342/165 |
| 5,412,414 | 5/1995 | Ast et al. | 372/174 |
| 5,530,449 | 6/1996 | Wachs et al. | 342/174 |
| 5,546,090 | 8/1996 | Roy, III et al. | 342/174 |

FOREIGN PATENT DOCUMENTS

| | | | |
|---|---|---|---|
| 0762541 | 3/1997 | European Pat. Off. | H01Q 21/00 |
| 9534103 | 12/1995 | WIPO | H01Q 3/26 |

*Primary Examiner*—Bernarr E. Gregory
*Attorney, Agent, or Firm*—Fulbright & Jaworski L.L.P.

[57] ABSTRACT

Systems and methods are disclosed for providing calibration of the phase relationships of signals simulcast from a transmission system. In a preferred embodiment, a calibration signal is introduced into the transmission system and provided to various antenna elements. Samples of the calibration signal are taken at a point very near the antenna elements so as to sample phase shifts introduced by the transmission system. The signals of sets of the antenna elements are combined after sampling for transmission down the antenna mast to the active circuitry of the present invention. Accordingly, the present invention operates to selectively energize antenna elements of the sets so as to provide a single calibration signal down the combined signal path. Through reference to sampled signals one at a time, the present invention determines a necessary phase adjustment to result in the desired phase relationship of the signals at the antenna elements.

43 Claims, 4 Drawing Sheets

SYSTEM AND METHOD FOR FULLY SELF-CONTAINED CALIBRATION OF AN ANTENNA ARRAY

REFERENCE TO RELATED APPLICATIONS

Reference is hereby made to the following, commonly assigned, U.S. patent applications: Ser. No. 08/582,525, entitled "METHOD AND APPARATUS FOR IMPROVED CONTROL OVER CELLULAR SYSTEMS", filed Jan. 3, 1996, now U.S. Pat. No. 5,884,147; Ser. No. 08/651,981, entitled "SYSTEM AND METHOD FOR CELLULAR BEAM SPECTRUM MANAGEMENT"filed May 20, 1996; Ser. No. 08/808,304, filed Feb. 28, 1997, entitled "CONICAL OMNI-DIRECTIONAL COVERAGE MULTIBEAM ANTENNA WITH MULTIPLE FEED NETWORK"; and Ser. No. 08/924,285, entitled "ANTENNA DEPLOYMENT SECTOR CELL SHAPING SYSTEM AND METHOD", filed Sep. 5, 1997, the disclosures of which are incorporated herein by reference.

TECHNICAL FIELD OF THE INVENTION

The present invention relates in general to the concurrent transmission of multiple signals from an antenna array and more particularly to calibration of the signals to avoid destructive combining when simultaneously transmitted from he antenna array.

BACKGROUND OF THE INVENTION

It is often desired to simulcast signals, i.e., concurrently transmit multiple signals, from a plurality of antenna elements comprising an antenna array (it shall be appreciated that as discussed herein, the antenna elements of an antenna array may in fact be any portion of an antenna structure producing a predefined radiation pattern when energized). Such simulcasting of signal is common, for example, in a phased array where each of the signals as provided to one of the antenna elements progresses in phase such that the energy radiated from all of the antenna elements combines and/or cancels to form a desired radiation pattern. Likewise, in a multibeam system, where individual predefined antenna beams are provided from an antenna array, simulcasting of signals, such as a control channel, over a plurality of the individual antenna beams so as to provide the signal in an area larger or differently shaped than that of an individual antenna beam, may be desired.

However, in the current state of the art, transmission of the aforementioned signals typically require a considerable amount of circuitry disposed between the transmitter and the antenna array. This circuitry may include significant lengths of transmission cable to carry the signal from the transmitter up the antenna mast to the antenna array. Additionally, active circuitry, such as filters, amplifiers, combiners, and the like may be disposed in the signal path to provide desired manipulation of the signals. This circuitry typically affects the transmitted signals in respects other than intended or desired.

For example, the lengths of cables associated with individual signals to be simulcast from an array may not be precise. Accordingly, a phase relationship, or phase progression, between the signals, initially introduced to provide a desired radiation pattern from the array, may be affected and thus nulls or other undesired effects in the combined radiation pattern may result.

Likewise, other circuitry, such as linear power amplifiers (LPA) disposed in the signal path may affect the desired phase relationship causing undesired results in the combined radiation pattern. Moreover, such circuitry may introduce cross coupling between the individual signals. For example, where a distributed amplifier is utilized, there is typically cross coupling between each of the input signals amplified. This cross coupling may affect the phase relationship in a non-linear or unpredictable manner. Therefore, it is difficult, if not impossible, to properly tune the signal circuits in order to maintain the desired phase relationships in advance or in a permanent fashion.

However, if the proper phase relationships are not maintained with respect to signals simulcast over multiple antenna elements, the combined radiation pattern may include the aforementioned nulls caused by destructive combining of signals. Present calibration techniques typically require the use of a probe, drone, or repeater communication unit to be placed in the radiation pattern of the antenna structure so as to provide information with respect to phase of the signals. One such system is disclosed in U.S. Pat. No. 5,546,090 issued to Roy. However, such techniques are undesirable as they require the deployment, maintenance, and expense of a transponder external to the antenna and transmission system being calibrated. The external transponder is an active component physically separate from, and often inconveniently located, causing additional expense in calibrating, servicing and testing such systems.

Accordingly, a need exists in the art for a fully self-contained, i.e., not external to the transmission and antenna circuitry, system and method for calibrating a plurality of signals to be simulcast so as to provide a desired phase relationship when simulcast.

A further need exists in the art for a system and method adapted to calibrate a plurality of signals to be simulcast which compensates for the existence of cross coupling or cross talk resulting from other signals.

A still further need exists in the art for any active components utilized in the calibration of signals to be disposed conveniently and securely with other active components of the transmission system.

A yet further need exists in the a t for the calibration system and method which operates automatically to dynamically calibrate a plurality of signals.

SUMMARY OF THE INVENTION

These and other objects, features and technical advantages are achieved by a system and method which is operable to measure signal attribute differences at the antenna array and provide attribute adjustment accordingly to eliminate undesired differences. A preferred embodiment of the present invention samples each signal to be simulcast from an antenna array at the tower top at a point as near the actual transduction of the signal to radiated energy as possible. Signal attributes, such as the phase, of the signals very near their conversion to radiated energy are compared against a reference signal in order to measure or determine the effects of the transmission signal path. Accordingly, this embodiment is adapted so as to sample substantially all signal attribute alteration introduced by the transmission circuitry in the sampled signal.

Furthermore, where there are signals simultaneously transmitted from the antenna structure, such as might be associated with other sectors of a sectorized system, these signals may be transmitted while signals of the plurality of signals of interest are sampled. This allows the present invention to sample signal attribute alteration associated with these other signals, such as is a result of cross coupling or cross talk in transmission circuitry, as well as maintain uninterrupted communication over these other sectors.

A preferred embodiment of the present invention utilizes only passive electronics at the tower top. Accordingly, deployment, operation, and maintenance of the present invention is simplified. Moreover, as the active components are not disposed tower top, which is typically an inaccessible and harsh environment susceptible to damage such as by high winds and lightning, cost advantages are realized. The passive components deployed tower top are inexpensive compared to active components and, thus, if damaged due to the harsh conditions are less expensive to replace. Additionally, cabling deployed up the mast between the transmitter system and antenna structure, such as for power and control signals, is reduced.

Moreover, in a preferred embodiment, a common signal path, or single cable, is utilized to provide the sampled signal for each of a plurality of simulcast signals to the active components of the present invention, thus maintaining the above mentioned cost advantages. In addition to providing cost advantages, this embodiment provides the further advantage of rendering moot any signal attribute modification to the sampled signals introduced by the return signal path as each of the sampled signals experiences the same signal path.

Accordingly, the present invention provides for the comparison of the relative signal attribute differences, such as phase differences, down mast. A control system, preferably deployed with the transmission equipment in order to take advantage of the already existing environment and provide simple coupling to existing equipment, determines the signal attribute changes introduced in the signals by the transmission circuitry and operates to adjust or calibrate the transmission signals accordingly. As the control system and electronics providing for the sampling of the signals are wholly contained within the transmission system, the present invention may autonomously operate to calibrate the transmission signals such as during a maintenance cycle.

It shall be appreciated that a technical advantage of the present invention is that a fully self-contained system and method for calibrating phase relationships of simulcast signals is provided.

A further technical advantage of the present invention is provided in the ability to compensate for the existence of cross coupling or cross talk resulting from other signals associated with the transmission system.

A still further technical advantage is provided in the deployment of only passive electronics in the tower top so as to provide any active components utilized in the calibration of signals conveniently and securely down mast with other components of this transmission system.

A yet further technical advantage is provided in the present invention's ability to operate automatically to calibrate signals without requiring the interruption of all communications provided by the system.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE PREFERRED EMBODIMENTS

In providing transmission of signals, it is often desired to illuminate predefined areas with radiation of a particular signal. In order to provide control of the area illuminated by a signal, i.e., produce a desired radiation pattern, it is common to utilize various antenna structures such as a phased array or a multibeam antenna.

A phased array utilizes a plurality of antenna elements disposed in a predetermined fashion relative to one another, such as by placing them a predetermined fraction of a wave length apart. These antenna elements are energized with the signal to be radiated in the predefined area, however the antenna elements are provided with discrete signals, individually adjusted, so as to form the desired radiation pattern when simultaneously energizing the antenna elements. For example, by providing a particular phase progression between these discrete signals, corresponding to the physical placement of the antenna elements, the signals radiated by the individual antenna elements will constructively and destructively combine so as to produce the desired radiation pattern.

A multibeam antenna utilizes a plurality of predefined radiation patterns, or antenna beams, associated with the various inputs of the multibeam antenna. A signal provided to a particular input of the multibeam antenna will be radiated in the associated antenna beam. If a different radiation pattern is desired, such as illumination of a larger area, the signal may be simultaneously provided to multiple inputs of the multibeam antenna. However, depending on the relationship of the antenna beam sources, simulcasting the signal over multiple antenna beams may destructively combine so as to result in undesired nulls. Accordingly, it is advantageous to provide these multiple signals with a particular phase relationship to one another to be simulcast and result in a desired combined radiation pattern.

Figure 1:
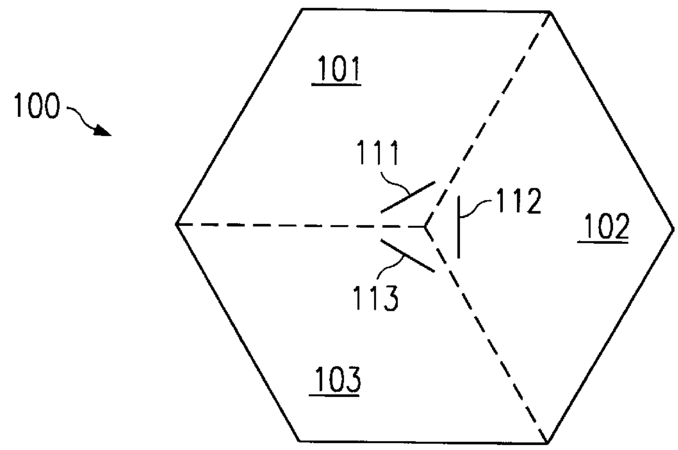
FIG. 1 (PRIOR ART)
FIG. 1 illustrates a cell of a cellular communication system having three sectors.

Directing attention to FIG. 1, a cell as might be associated with a cellular communication system is illustrated as cell 100. Cell 100 is illustrated having antenna sections 111, 112, and 113. Each antenna section is associated with a sector of the cell. However, it shall be appreciated that, although discrete antenna structures are shown for the cell sectors illustrated, that there is no such limitation of the present invention.

Antenna section 111 is associated with an α sector, sector 101, antenna section 112 is associated with a β sector, sector 102, and antenna section 113 is associated with a Γ sector, sector 103. Of course, cell 100 may include any number of sectors desired, including a single or omni sector.

Figure 2:
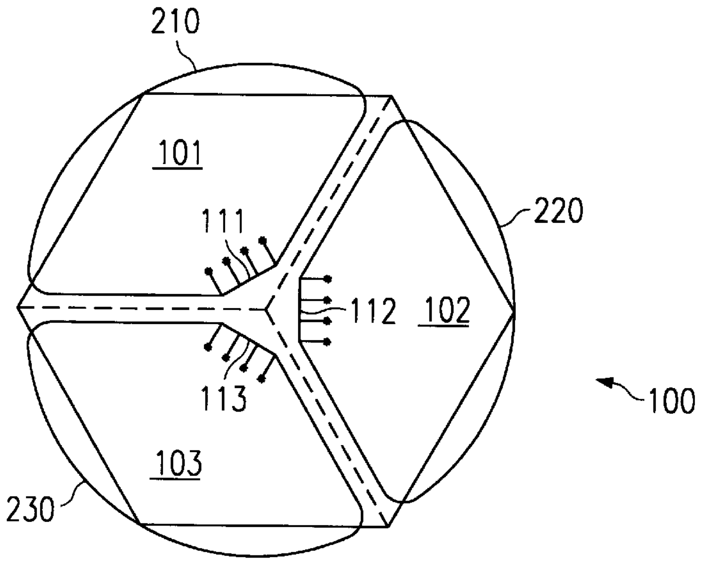
FIG. 2 (PRIOR ART)
FIG. 2 illustrates the cell of FIG. 1, wherein phased arrays are used to illuminate the sectors.

In a phased array system, such as described above, each of the antenna sections may include, for example, a panel of antenna elements. For aid in understanding the present invention an array of 4 antenna elements disposed across the face of the antenna section a predetermined fraction of a wave length apart, as illustrated in FIG. 2, will be discussed. However, it shall be appreciated that the present invention is operable with any number of elements of such an array.

Each of these antenna elements nay be provided a discrete signal so as to produce a composite radiation pattern substantially confined to the area of the associated sector. Accordingly, each antenna element may be provided a signal phased appropriately with respect to the other antenna elements of the antenna section, i.e., 4 renditions of the signal to be radiated in a sector each having a predetermined phase with respect to the others are provided one each to the antenna elements, so as to destructively combine in areas outside of the associated sector. Thus, radiation patterns illuminating the sectors, such as illustrated in FIG. 2 as radiation patterns 210, 220, and 230 associated with antenna sections 111, 112, and 113 respectively, may be provided. Additionally, by adjusting the phase relationships of the signals provided to the antenna elements, attributes of the radiation pattern, such as the shape, direction, or azimuth, may be changed.

Figure 3:
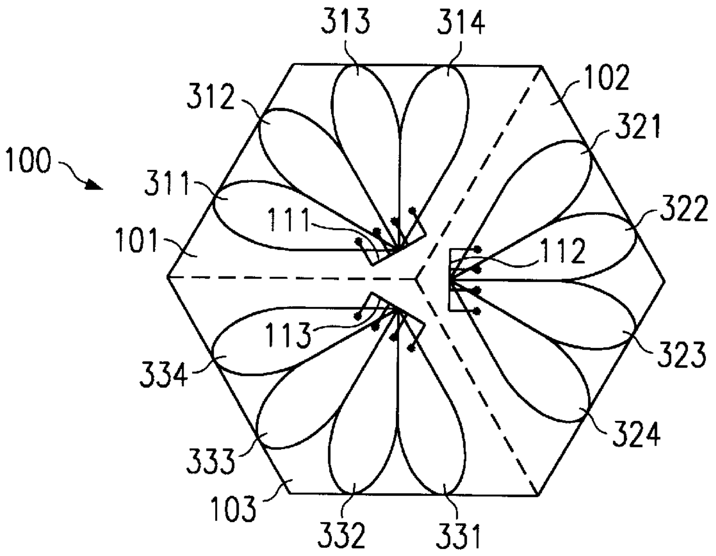
FIG. 3 illustrates the cell of FIG. 1, wherein a multibeam antenna is used to illuminate the sector.

In a multibeam antenna system, such as described above, each of the antenna sections may include, for example, a plurality of antenna beam sources, whether individual antennas or a single antenna providing multiple antenna beams. It shall be appreciated that the antenna beam sources of multiple ones of the antenna seams may in fact include the use of common antenna elements, such as through excitation utilizing a different phase progression, in order to form the desired antenna beam. To aid in the understanding the present invention panels of 4 antenna beams provided by 4 antennas per antenna section, as illustrated in FIG. 3, will be discussed. However, it shall be appreciated that the present invention is operable with any number of antenna beams, with or without their identification with antenna panels. For example, an antenna structure providing a plurality of antenna beams useful according to the present invention is shown in the above referenced application entitled "Conical Omni-Directional Coverage Multibeam Antenna with Multiple Feed Network" previously incorporated by reference, U.S. patent application Ser. No. 08/808,304, filed Feb. 28, 1997.

Each of the antenna beam source may be provided a discrete signal input so that particular antenna beams to radiate a signal may be selected by providing the signal to that particular antenna beam input. Where it is desired to provide a particular signal in an area different than that of a single antenna beam, that signal is simultaneously provided to multiple ones of the antenna beam inputs. However, in order to avoid undesired destructive combining, or to otherwise provide a desired composite radiation pattern, each antenna beam may be provided a signal phased appropriately with respect to the other antenna beams, i.e., multiple renditions of the signal to be simulcast each having a predetermined phase with respect to the others are provided one each to the appropriate antenna beams, so as to form a desired composite radiation pattern.

Additionally, as described above, the signal provided to the particular antenna beam input may in fact energize multiple antenna elements also associated with another antenna beam source. Accordingly, a signal simulcast on multiple ones of the antenna beams may in fact be provided to particular antenna elements in multiple phase progression relationships associated with the multiple beam sources. Therefore, the opportunity for destructive combining exists even before radiation of the signals and further enhances the need for provision of signals having precisely adjusted attributes to the antenna beam sources in order to result in the desired radiation pattern.

For example, a radiation pattern synthesizing a sector radiation pattern of FIG. 2 may be generated, substantially without nulls in the areas of overlap, by providing properly phased signals to antenna beams 311–314, 321–324, or 331–334 associated with the desired sector. Similarly, the entire cell may be illuminated with a signal, such as a control channel signal, by providing properly phased signals to each of antenna beams 311–314, 321–324, and 331–334. Moreover, as described above, by adjusting the phase relationships of the signals provided to the antenna elements, attributes of the radiation pattern, such as the shape, direction, or azimuth, may be affected in a desired manner.

Figure 4:
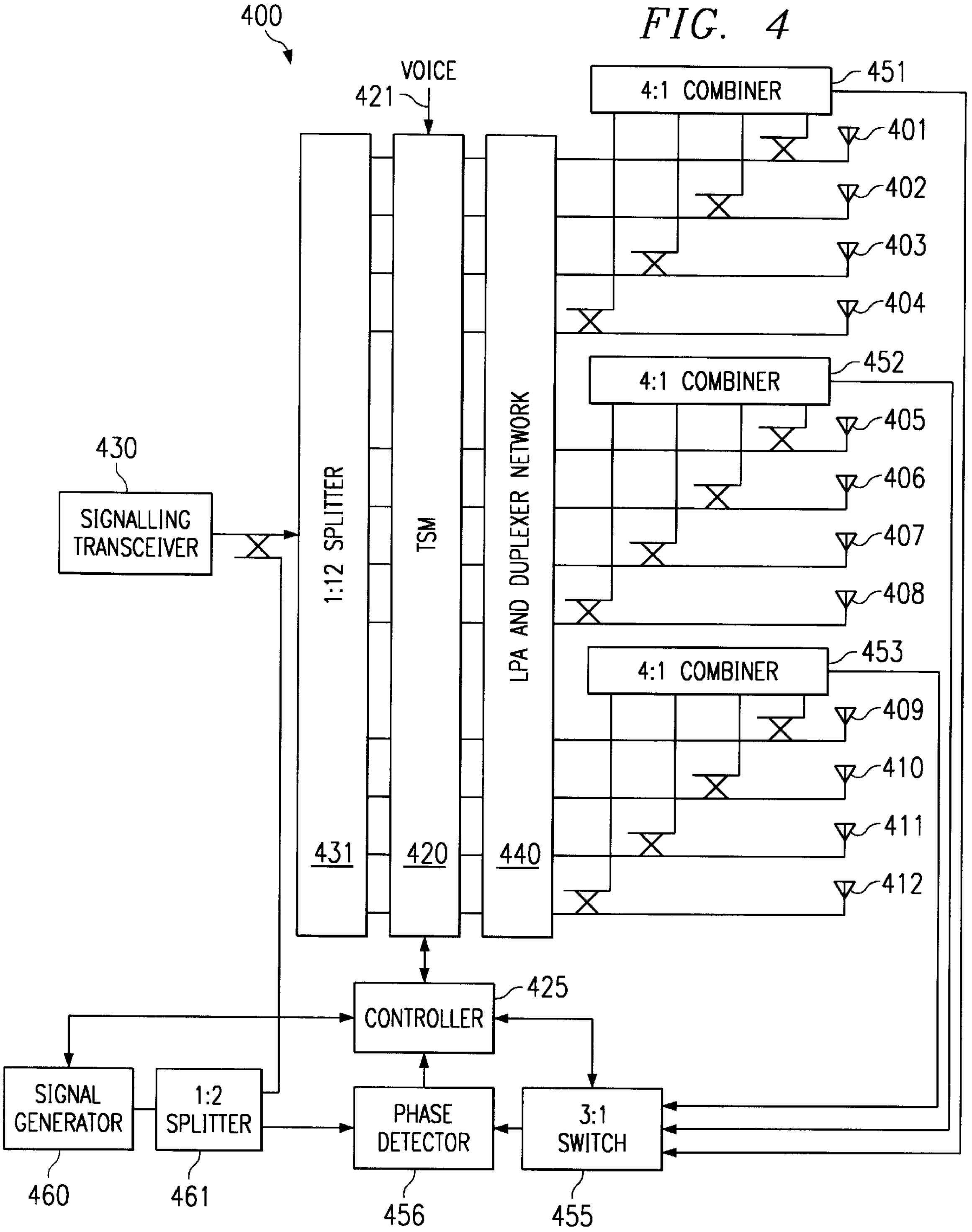
FIG. 4 illustrates a block diagram of a preferred embodiment of the circuitry of the present invention.

Directing attention to FIG. 4, a block diagram of a preferred embodiment of the present invention is illustrated as a part of communication system 400. Shown are antennas 401–412, which correspond to antenna structures 111, 112, and 113 of FIGS. 1–3. It shall be appreciated that, for the purpose of understanding the concepts of the present invention, it is not important whether antennas 401–412 provide individual antenna beams, such as where antenna 401 includes antenna elements common to antenna 402 although energized with a different phase progression to result in a particular antenna beam as discussed with respect to FIG. 3, or are individual antennas elements used to combine signals with adjacent antennas as in a phased array, such as discussed with respect to FIG. 2 and the individual antenna beams of FIG. 3. Although, in actual implementation it shall be understood that the particular phase relationship or other signal attributes between the signals simulcast on adjacent antennas may differ greatly for the two above antenna systems. Additionally, it shall be appreciated that, although illustrated as discrete antennas, antennas 401–412 may in fact be any antenna structure accepting multiple inputs, including a single multibeam antenna, according to the present invention.

Voice channel signals are provided to the antennas for transmission through interface 420 provided in transmit synthesis module (TSM) 420. The voice channels may be provided in a number of ways, such as sector signals to be transmitted by all antennas of a particular sector or signals to be switched to the appropriate beams for a particular remote communication unit to receive the signal. Accordingly, it shall be appreciated that interface 421 may in fact comprise a plurality of voice channel inputs associated with discrete signals. Therefore, TSM 420, operating under control of a controller such as controller 425, may provide the appropriate switching of voice channel signals to appropriate ones of antennas 401–412. Systems and methods adapted to provide such control of signals to particular antennas or antenna beams are shown in the above referenced application entitled "System and Method for Cellular Beam Spectrum Management" previously incorporated herein by reference.

Signalling transceiver 430 provides control channel signals for remote units in communication with communication system 400. In the embodiment shown, splitter 431 splits the control signal 12 ways for provision to each of antennas 401–412 through TSM 420. Accordingly, the control channel information may be simulcast by each of antennas 401–412 in order to provide the control channel information to all remote units in communication with communication system 400. These split signals are manipulated by TSM 420 to provide any desired signal attributes such as phase relationships, for proper simulcasting of the signals. However, it shall be appreciated that simulcasting of a particular signal to all antennas is not a limitation of the present invention.

The remainder of the signal transmission circuitry of communication system 400 includes linear power amplifier (LPA) and duplexer network 440. This network may provide signal conditioning, such as filtering and/or amplification, in order to present desired signals to each of the antennas. For example, network 440 may include a number of LPAs configured as a distributed amplifier, i.e., providing a Butler matrix and an inverse Butler matrix with a plurality of LPAs disposed between so as to amplify a portion of each signal at each LPA. Furthermore, in the embodiment where antennas 401–412 are individual antennas elements used to form various antenna beams through proper phase progression excitation, such as discussed with respect to the individual antenna beams of FIG. 3, network 440 may include beam forming networks. For example Butler matrixes may be provided having inputs associated with a particular antenna beam and outputs providing the proper phase progression to ones of antennas 401–412. However, it shall be appreciated that a network such as network 440 may introduce undesired cross coupling between the various individual signals input.

Additionally, it shall be appreciated that the transmission circuitry associated with each individual signal provided to antennas 401–412 may introduce signal attribute changes to the signals. These attribute changes may include signal attenuation, phase delays, and the like. Moreover, the attribute changes introduced may be significantly different for each of the antenna signals. For example, where the signalling transmitter is providing a control channel to each of antennas 401–412 for simulcasting, although initially being in phase and having a same amplitude, or otherwise having a particular attribute relationship such as may be controlled by TSM 420 and/or network 440, the individual signals may arrive at the antennas having different phases and/or amplitudes, introduced by undesired cross coupling and the like in circuits of TSM 420 and network 440, as well as the various transmission cables, and any other circuitry disposed in the signal paths.

It is typically desired to provide the signals to the antennas with a particular phase and/or amplitude relationship. For example, in the phased array example discussed above, a particular phase progression may be desired in order to provide a composite radiation pattern of a particular size, shape, and/or azimuth. Likewise, in the multibeam antenna system a particular phase progression, or lack thereof, may be desired in order to prevent nulls in the combined radiation pattern.

However, the above mentioned signal attribute changes introduced by the transmission circuitry make the provision of the individual signals with precise signal attributes, such as phase and/or amplitude relationships, difficult, if not impossible. The problem of providing the desired signal attribute relationships at the antenna is further complicated by the inclusion of active components in the transmission signal path which may introduce attribute changes which are difficult to predict and which may vary, such as with time, temperature, frequency, or the like.

For example, circuitry such as the aforementioned distributed amplifier or beam forming matrix, may provide undesired cross coupling capable of introducing significant signal attribute changes. Moreover, as the signal attribute changes are a function of the other signals being communicated through the system, these changes are not predictable, i.e., the signal attribute changes cannot be compensated for until the cross coupled signals are present and, likewise, need not be compensated for unless and until the cross coupled signals are present.

Accordingly, the present invention operates to sample the antenna signals at a point very near their actual transduction into radiated energy in order to detect and compensate for all, or substantially all, of the signal attribute changes introduced by the transmission system. These signal attribute changes include not only the linear phase and/or amplitude changes introduced such as by the physical length of transmission cables associated with each signal, but also those introduced by cross coupling of various other ones of the signals.

Still referencing FIG. 4, combiners 451, 452, and 453 are coupled to signal paths between network 440 and antennas 401–412. It shall be appreciated that although the use of 4:1 combiners is shown in FIG. 4, there is no such limitation on the present invention. The number of signal paths combined for sampling according to the present invention, may be any number of signal paths which are selectively energizable or are otherwise discernable for calibration as will be discussed hereinbelow.

As discussed above, preferably the couplers providing the antenna signals to each of the combiners is at a point in the signal path as near the antennas as possible, in order to include as much of the signal attribute changes introduced by the transmission circuitry as is possible. Additionally, as will be better understood from the discussion hereinbelow, each coupler providing the antenna signals to combiners 451, 452, and 453 are preferably provided at a same relative physical location in the transmission path with respect to each antenna, i.e., each coupler is disposed a same distance in the signal path from the corresponding antenna.

Each of combiners 451–453 provides a single signal to switch 455. It shall be appreciated that, in the preferred embodiment, combiners 451–453, along with their associated antenna signal couplers and transmission cables providing signals to switch 455, are the only portions of the present invention disposed tower top. Accordingly, only passive electronics are subject to the typically harsh environment of tower top conditions.

Switch 455 operates under control of controller 425 to provide sampled signals to phase detector 456. In the preferred embodiment, phase detector 456 accepts an exemplary or reference signal for comparison to the sampled signals provided by switch 455. However, in an alternative embodiment phase detector 156 may compare sampled signals, such as through storing a sample for comparison or directly comparing sampled signals. Based on comparisons made by phase detector 456, controller 425 manipulates TSM 420 to compensate for any undesired signal attributes as sampled. It shall be appreciated that, although described in a preferred embodiment as utilizing a phase detector, the present invention may in fact compare various signal attributes, including amplitude, for calibration by controller 425.

In a preferred embodiment, signal generator 460 is provided to generate a preselected calibration or test signal for use in calibration according to the present invention. The calibration signal is split by splitter 461 both for provision to the transmission circuitry and to phase detector 456.

Preferably the calibration signal is introduced into the transmission signal path through the use of coupling techniques well known in the art. Accordingly, physical interruption of the original signal path, such as is associated with the introduction of the control channel by signalling transceiver 430, is not required in order to calibrate a transmission system according to the present invention. Of course, in order to more accurately sample the effects of the transmission circuit, the calibration signal should be provided in band with respect to the communication system. Therefore, where simultaneous transmission of signals of the transmission system and the calibration signal are desired, the attributes of the calibration signal, such as frequency and/or timing, are selected so as not to substantially interfere with the signals of the communication system.

Of course, rather than provide for non-interruptive coupling of the calibration signal with that of the signalling transceiver, interruptive introduction of the calibration signal into the transmission system may be utilized, if desired. For example, a switch matrix disposed in the signal path between signalling transceiver 430 and spitter 431 may be utilized to switchably select the calibration signal in lieu of another signal, such as during a maintenance period used for system calibration.

Moreover, rather than using a calibration signal, the present invention may operate to sample a signal native to the communication system for determination of undesired signal attributes introduced by the system. For example, rather than introducing a calibration signal at the coupler illustrated in the signal path of signaling transceiver 430, the native signal associated therewith may be sampled for provision to phase detector 456.

Having been introduced in the transmission signal path, the calibration signal is available for transmission through the same signal paths as is, or was depending on the use of interruptive coupling, the signal originally associated with the signal path. In the illustrated embodiment, the calibration signal is split by splitter 431 and is, therefore, available for transmission to each of antennas 401–412 as may be selected by TSM 420 under control of controller 425. Accordingly, the signal attribute changes associated with any or each signal path through which the signalling transceiver's signal may be transmitted can be compensated for according to the present invention.

Figure 5:
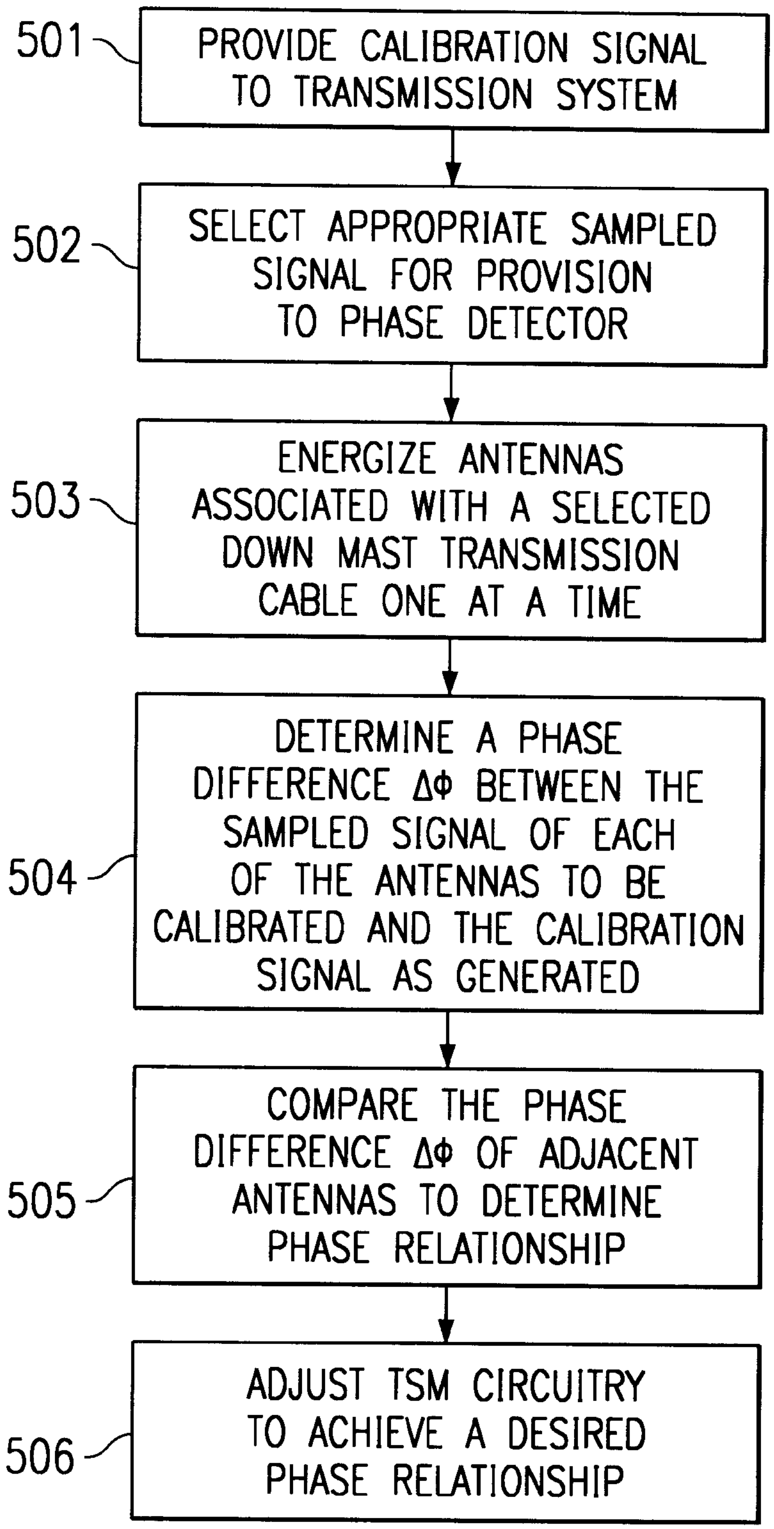
FIG. 5 illustrates a flow diagram of the operation of the present invention.

Having described the circuitry of the present invention, operation of a preferred embodiment of the present invention will be described with reference to the flow chart of FIG. 5. It shall be appreciated that control of the steps of FIG. 5 is performed in the preferred embodiment by a processor of controller 425 operating according to a predefined set of instructions. Accordingly, controller 425 is a processor based system having sufficient memory and interfaces to provide the functionality described herein. A general purpose computer system programmed according to the present invention and adapted to include the described interfaces may be used in practicing the present invention.

At step 501 the present invention operates to provide a calibration signal to the transmission system. Provision of the calibration signal may include such steps as controller 425 providing a control signal to signal generator 460 to generate an appropriate calibration signal. Additionally, in an alternative embodiment, controller 425 may provide a control signal to a switch to switchably discontinue a particular signal, such as a control channel signal of signalling transceiver 430, and instead provide the calibration signal. Of course, in the alternative embodiment where a native signal is used in determining signal attributes, transmission of a calibration signal at step 501 may be eliminated.

At step 502, the present invention operates to select an appropriate sampled signal for provision to phase detector 456. For example, where it is desired to calibrate the signals of a group of antennas, such as antennas 401–404, the down mast transmission cable associated with combiner 451 may be selected for communication to phase detector 456 by switch 455. It shall be appreciated that, where it is desired to calibrate the signals of all the antennas, each of the down mast transmission cables may be selected in time. Of course, where only one group of antennas are provided, such as in the alternative embodiment utilizing a single combiner and down mast transmission cable for all twelve of the antennas, the step of selecting an appropriate sampled signal may be omitted.

At step 503 the signal paths associated with the antennas coupled with a selected down mast transmission cable are energized one at the time. It shall be appreciated that where the beam forming matrix of the embodiment where antennas 401–412 are individual antenna elements used to form various antenna beams through proper phase progression excitation, such as discussed with respect to the individual antenna beams of FIG. 3, energizing the signal paths, and thus the antennas, one at the time may require disrupting certain signal paths. For example, where a Butler matrix beam forming network is used to provide an antenna beam signal in proper phase progression to the various antennas, particular outputs of the Butler matrix may be switchably disconnected one at the time during input of a particular antenna beam signal into the Butler matrix. Accordingly, samples, associated with a selected antenna beam signal, may be taken as provided to each antenna which include the influence of the beam forming network.

It shall be appreciated that the above mentioned disruption of certain signal paths, in order to energize the antennas coupled to the selected down mast signal path one at a time, may require the use of control circuitry (not shown). This control circuitry may include switchable links disposed in or accompanying the beam forming matrixes (not shown), and control signal paths (not shown) between the switchable links and controller 425. In a preferred embodiment, where the beam forming matrixes are included in network 440, the above mentioned control circuitry and control signal paths remain down mast and, thus, do not increase deployment of active elements at the tower top.

Additionally, where the beam forming matrixes of a multibeam antenna are disposed tower top, sampling of signals associated with a selected down mast signal path one at the time may be accomplished according to the present invention without increasing deployment of active elements at the tower top. Directing attention to FIG. 6, a portion of the transmission circuitry of FIG. 4 is illustrated wherein the beam forming matrixes, matrixes 601–603, are not included as part of network 440. This figure represents, for example, the above discussed embodiment where antennas 401–412 each provide individual antenna beams, such as where antenna 401 includes antenna elements common to antenna 402 although energized with a different phase progression to result in a particular antenna beam as discussed with respect to FIG. 3. Here the sampled signals coupled to a selected down mast signal path are antenna beam signals, i.e., the signal which will ultimately be split and provided with a proper phase progression for transmission by an array of antenna elements, rather than the signals associated with each antenna element. Accordingly, though provision of the calibration signal to only one antenna beam of the group of antenna beams associated with the selected down mast signal path at a time, such as through proper switching of TSM 420, sampling according to the present invention may be accomplished.

Figure 6:
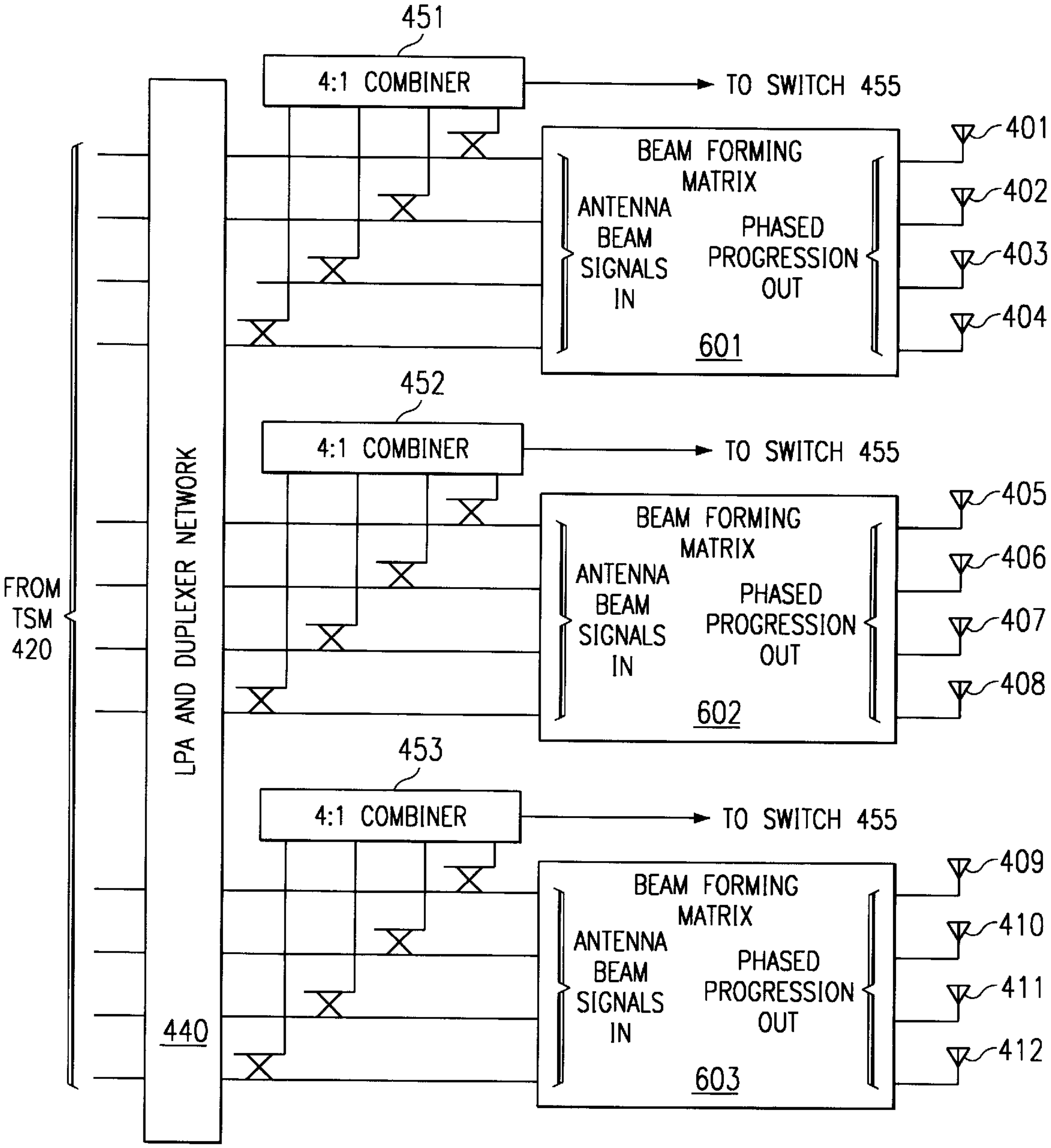
FIG. 6 illustrates an alternative embodiment of a portion of the circuitry of FIG. 4 wherein calibration of individual antenna beam signals are sampled.

The above described sampling of antenna beam signals does not sample the effects of the beam forming matrix. However, it shall be appreciated that sampling as described with respect to FIG. 6 is accomplished sufficiently close to transduction of the transmitted signal to radiated energy to allow for compensation of substantial signal attribute alteration caused by the transmission system. Of course, through the adaption of the outputs of beam forming matrixes 601–605 as described above, sampling of the signals in the embodiment of FIG. 6 could be adapted to include the effects of the beam forming matrixes.

Preferably, signals of the antennas which do not have signals combined by the combiner associated with the particular down mast transmission cable selected by switch 455 remain energized. Having these other antennas remain energized while sampling the signal of a particular antenna allows the present invention to incorporate the effects of cross coupling from these other signals when calibrating the antenna signals. For example, where the transmission cable of combiner 451 is selected by switch 455, and the signal of antenna 401 is currently being sampled for provision to phase detector 456, antennas 402–404 will not be energized while antennas 405–412 will remain energized. Accordingly, any effects of cross coupling from the signals of antennas 405–412 with respect to the signal of antenna 401 will be accounted for in the calibration of the signal of antenna 401 according to the present invention. Of course, where some or all of these other signals are not simultaneously provided when the particular antenna of interest is actually in use, energizing of the other antennas during sampling may be modified accordingly.

In the preferred embodiment energizing of each of the antennas of a single combiner is accomplished one at a time so as to provide only that antenna's signal to phase detector 456. If multiple ones of the antennas of a single combiner are energized simultaneously, their signals would be combined by their common combiner and thus a combined signal, losing much, if not all, of the information with respect to the change in the individual antenna signal attributes. Of course, other approaches may be utilized where multiple antennas are energized at various phase and amplitude relationships, such as digital signal processing, if desired. Regardless, of the method by which the information is acquired, the present invention operates to detect phase differences in each signal path so as to provide for their individual calibration.

However, use of the common signal path for multiple ones of the sampled antenna signals is preferred as the down mast signal path of the sampled signals is a significant source of errors in the determination of relative phases of the antenna signals. Specifically, if discrete signal paths were to be provided down mast for each of the antenna signals, in addition to the added cost, precision in their lengths would necessarily be required to avoid the introduction of a relative phase differential by the separate sampled signal transmission paths. Accordingly, the present invention utilizes a common down mast signal path for a plurality of sampled signals in order to avoid the above problems and errors.

Selective energizing of the antennas as provided at step 503 may be provided by controller 425 providing appropriate control signals to TSM 420 and/or network 440. For example, saving information with respect to a particular antenna signal to sample, such as the signal of antenna 401, controller 425 may provide a control signal such that TSM 420 switchably disconnects transmission of the calibration signal to other antennas, such as antennas 402–404, associated with the same combiner, such as combiner 451. However, controller 425 preferable operates to allow the calibration signal to pass through TSM 420 to other of the antennas, such as antennas 405–412.

At step 504 the present invention operates to determine a phase difference, $\Delta\Phi$, between the sampled signal of each of the antennas to be calibrated and the calibration signal as generated (or where a native signal is used, the native signal as originated). Accordingly, as each antenna associated with a particular selected combiner is energized with the calibration signal, phase detector 456 compares the sampled signal with that of the generated calibration signal and provides information with respect to the phase difference $\Delta\Phi_n$, where n is the particular antenna signal sampled, to controller 425. From this information, controller 425 may determine the relative phases of the sampled signals. For example, the relative phases of antenna signals associated with antenna 401 and antenna 402 may be determined by controller 425 comparing $\Delta\Phi_{401}$ to that of $\Delta\Phi_{402}$.

Alternatively, phase detector 456 may directly compare sampled signals to one another rather than to the signal source. Accordingly, multiple down mast signal paths may be utilized to provide multiple sampled signals for comparison, or active elements may be deployed tower top in order to allow for the direct comparison of sampled signals. Alternatively, phase detector 456 may s ore a sampled signal accompanied by other pertinent information, such as precise timing information, for direct comparison to another signal sampled subsequently thereto. For example, through reference to timing in formation associated with the two samples, relative phase information may be determined without reference to the aforementioned signal source. Accordingly, a single down mast signal path may be utilized, as described above, in directly comparing sampled signals.

It shall be appreciated that the use of any length of signal path to provide the sampled signals introduces a change in the sampled signals attributes, such as a phase difference. However, since multiple ones of the sampled signals utilize the same signal path this attribute change is common for all such signals. Therefore, in the determination of relative differences between the antenna signals according to the preferred embodiment of the present invention, the attribute changes introduced by this common signal path may be ignored.

As the determination of the relative phase differences of the sampled signals relies in part on the commonality of the signal paths of the sampled signals, each of the couplers providing the sampled signals to the combiners of the present invention are placed at a relative same position in the transmission signal path. For example, in a preferred embodiment each of the couplers are placed at the point in the transmission signal path where the respective antenna is coupled to the transmission cable. Accordingly, each of the sampled signals includes the same amount of phase delay introduced as a function of transmission cable length.

It shall be appreciated that, although a preferred embodiment of the present invention utilizes a common down mast signal path for antenna signals most likely to require predetermined phase relationships, such as the antennas of a single antenna section or panel, the present invention is not limited to calibration of signal attributes with reference only to the signals of antennas so related. For example, by providing the various down mast signal paths with as similar attributes as possible, i.e., the same cable lengths and the like, the present invention may make a comparison of the relative phase differences between sampled signals associated with antennas not of the same combiner. Of course, any differences in the different sampled signal paths will introduce errors into the calibration of the signals.

At step 506 the present invention operates to adjust the transmission circuitry in order to calibrate the various antenna signals. In the preferred embodiment, controller 425, through the aforementioned comparisons of $\Delta\Phi_n$, determines an amount of phase adjustment necessary for a particular signal or signals in order to achieve a desired phase relationship. For example, where it is desired to provide the antenna signals in phase, i.e., no relative phase difference, at each of antennas 401–404, controller 425 compares the phase differences of each of the antenna signals associated with antennas 401–404 to determine if there is any relative phase difference. If there is a relative phase difference between any of the antenna signals, then a control signal is provided to TSM 420 in order to mitigate this phase difference. Mitigation of the phase difference, or other monitored signal attribute, may be accomplished by adjusting the phase, or other signal attribute, of a particular signal which sample was determined to include an undesired differential. Alternatively, adjusting of the signal attribute may by accomplished through adjusting the attributes of other signals, such as those interfering with the particular signal which sample was determined to include an undesired differential.

In a preferred embodiment, TSM 420 includes in-phase and quadrature (I/Q) circuitry in order to in dependently adjust the phase of each antenna signal. Accordingly, controller 425 may provide control of the amplitude of two 90° out of phase signals being combined so as to result in a signal having the desired phase. Of course, other methods of phase adjustment may be utilized according to the present invention, such as the use of switchable phase delays, such as may be provided by different lengths of cable, surface acoustic wave devices, or digital signal processing, if desired.

It shall be appreciated that, although the calibration signal of a preferred embodiment of the present invention is shown being introduced in the signalling transceiver's signal path, there is no such limitation of the present invention. Accordingly, a calibration signal may be introduced in the transmission circuitry at other points, such as prior to or at voice channel interface 421. For example, where there is circuitry which may introduce error associated with the simulcasting of voice channels of the transmission system, it may be advantageous to introduce the calibration signal of the present invention at a point in the voice signal path before such circuitry in order to sample its effects.

Additionally, the present invention is not limited to a single introduction point of the calibration signal. For example, switching circuitry may be provided to introduce the calibration signal into the transmission system at various points, such as the signalling transceiver and voice channel signal paths mentioned above, in order to calibrate the system for each of these signals. Moreover, multiple calibration signals may be introduced at various points in the transmission signal path simultaneously, distinguished such as by frequency or code, in order to sample the effects of signals of the various signal paths on one another. In this alternative embodiment, phase detector 456 may be adapted to distinguish between the various calibration signals in order to provide controller 425 with changed signal attribute information with respect to each calibration signal. Accordingly, controller 425 could operate to control circuitry of TSM 420 to calibrate the various signal paths independently, i.e., adjust the voice channel signals and control channel signals independently of one another.

As discussed above, the present invention may operate to calibrate signals without requiring the interruption of all communications of the transmission system. By using a native signal, or selecting a calibration signal which does not substantially interfere with communications that are to be concurrently serviced during sampling of the calibration signal, these communications may continue to proceed on ones of the antenna elements remaining energized during sampling. Accordingly, referring again to the above example where antenna 401 is currently being sampled, antennas 405–412 are available to host communications. Of course, such communications are substantially restricted to sectors 102 and 103. Where a native signal is used for sampling, although only being available at a single antenna at a time, limited communications may be maintained within the sector under test. Moreover, through active control of the cellular system, communication units operating in sector 101 may be serviced by other nearby sectors or cells, such as through pro-active handoffs and/or sector or cell shaping. Systems and methods providing adjustment of communications throughout a neighborhood of cells useful according to the present invention are disclosed in the above referenced application entitled "Method and Apparatus for Improved Control over Cellular Systems", previously incorporated by reference. Likewise, systems and methods providing adjustment of sector and cell attributes are disclosed in the above referenced application entitled "Antenna Deployment Sector Cell Shaping System and Method" previously incorporated by reference.

It shall be appreciated that, although the sampling of antenna signals of a preferred embodiment of the present invention is illustrated as distinguishing the antennas in three groups, there is no such limitation of the present invention. For example, through the use of a 12:1 combiner in place of combiners 451–453, samples may be taken from all of the antenna signals utilizing a single combiner and down mast transmission cable, if desired. However, as discussed above, in order to allow for the use of passive electronics tower top, as well as to reduce the cost of, and error introduced by, the use of a large number of down mast transmission cables, the present invention transmits only the particular antenna signal of a combined group of antenna signals when sampling. Therefore, the larger the number of sampled signals combined for down mast transmission, the fewer signals which are available for simultaneous transmission when sampling and the less the effects of cross coupling can be sampled and compensated for. Accordingly, a preferred embodiment of the present invention utilizes a number of sampled signal combiners, and thus down mast transmission cables, equal to the number of sectors defined in the cell.

Alternatively, the present invention may utilize more down mast transmission cables in order to provide independent sampling of more antenna signals, i.e., requiring fewer antennas to be de-energized when sampling a particular antenna signal. However, it shall be appreciated that the down mast transmission cables are a significant source of error in the measurement of phase differences. Accordingly, the preferred embodiment of the present invention provides a sufficient number of combiners/down mast links that simultaneous transmission of at least some antenna signals not currently being sampled may be maintained while having a sufficiently few number of combiners/down mast links that their associated sampling errors do not unacceptably effect signal calibration.

It shall be appreciated that calibration of the electrical length of a signal path according to the present invention is valid for various communication protocols. Specifically, it is anticipated that the circuitry of the present invention may be utilized in analogue as well as digital systems, such as CDMA systems.

Although the present invention and its advantages have been described in detail, it should be understood that various changes, substitutions and alterations can be male herein without departing from the spirit and scope of the invention as defined by the appended claims.

What is claimed is:

1. A system for calibrating a particular signal attribute of a first signal of a plurality of signals, said calibrated signal attribute of said first signal having a predetermined relationship to other ones of said plurality of signals, said system comprising:

means for introducing a known signal into a multi-beam communication system having at least a discrete portion of a signal path associated with each of said plurality of signals, wherein said known signal is provided to multiple ones of said discrete portions of signal path;

means for sampling said known signal at the discrete portion of signal path associated with said first signal and at the discrete portion of signal path associated with said other ones of said plurality of signals;

means for determining a relationship of said particular attribute of said first signal with respect to said particular attribute of said other ones of said plurality of signals; and means utilizing said determined relationship for adjusting circuitry disposed in said discrete portion of signal path associated with said first signal to provide said predetermined relationship of said first signal with respect to said other ones of said plurality of signals.

2. The system of claim 1, wherein said known signal is a signal native to said communication system.

3. The system of claim 1, wherein said known signal is a calibration signal not native to said communication system.

4. The system of claim 1, wherein said introducing means and said sampling means are disposed in said communication system so as to pass said known signal through substantially all of a transmission signal path of said communication system.

5. The system of claim 1, wherein said determining means comprises:

means for comparing samples of said known signal with an exemplary of said known signal;

means for determining said particular signal attribute change between each of said compared samples of said known signal and said exemplary of said known signal; and means for comparing said determined changes to determine said relationship of said particular attribute of said first signal with respect to said particular attribute of said other ones of said plurality of signals.

6. The system of claim 1, wherein said adjusting means comprises:

processor based means for controlling said circuitry, wherein said controlling means comprises:

a control signal interface coupled to said circuitry; and a control signal interface coupled to a selection circuit, said selection circuit coupled between said sampling means and said determining means and providing selection between groups of sampled known signals, wherein said first signal and said other ones of said plurality of signals are included in a same first group of said groups.

7. The system of claim 6, wherein said circuitry provides selective interruption of ones of said discrete portion of signal paths, and wherein said circuitry allows a single signal of said first group to pass at a time under control of said controlling means.

8. The system of claim 7, wherein said circuitry allows signals of said plurality of signals of a second group of said groups to pass simultaneously with allowing said single signal of said first group to pass.

9. The system of claim 8, wherein said sampling means comprises:

means for combining signals of said first group of said groups, wherein a single signal path is provide from said combining means to said determining means.

10. The system of claim 8, wherein said determining means comprises:

means for comparing a first sampled signal of said first group selected by said selection circuit with an exemplary of said known signal;

means for determining an attribute change between said compared first sampled signal and said exemplary of said known signal;

means for comparing a second sampled signal of said first group selected by said selection circuit with an exemplary of said known signal;

means for determining an attribute change between said compared second sampled signal and said exemplary of said known signal; and means for comparing said attribute change of said first samples signal and said second sampled signal to determine said relative attribute difference with respect to said first sampled signal and said second sampled signal.

11. The system of claim 1, wherein said system is disposed to provide only passive components on an antenna structure of said communication system.

12. The system of claim 1, wherein said particular signal attribute is a phase of said first signal.

13. The system of claim 1, wherein said particular signal attribute is an amplitude of said first signal.

14. A method for calibrating a signal attribute of a first signal of a plurality of signals wherein said plurality of signals include at least two mutually exclusive sets of signals, said first signal being associated with a first set of said at least two sets, said calibrated signal attribute of said first signal having a predetermined relationship to a second signal of said first set, said method comprising the steps of:

introducing a known signal into a communication system having at least a discrete portion of a signal path associated with each of said plurality of signals, wherein said known signal is provided to multiple ones of said discrete portions of signal path including at least the signal path associated with said first signal and the signal path associated with said second signal;

sampling said known signal at the discrete portion of signal path associated with said first signal and at the discrete portion of signal path associated with said second signal;

determining an attribute of said first signal relative to said second signal; and adjusting with reference to said determined attribute said signal attribute of said first signal to result in a predetermined signal attribute relationship between said first signal and said second signal as sampled at said discrete portion of signal path.

15. The method of claim 14, wherein said adjusting step comprises the step of:

controlling circuitry disposed in said discrete portion of signal path associated with said first signal, wherein said circuitry is disposed substantially more near in the signal path to a source of said first signal than is a point of said discrete portion of signal path said known signal is sampled.

16. The method of claim 15, wherein said determining step comprises the steps of:

comparing a sample of said first signal with an exemplary of said known signal;

determining an attribute change between said first signal and said exemplary of said known signal;

comparing a sample of said second signal with an exemplary of said known signal;

determining an attribute change between said second signal and said exemplary of said known signal; and comparing said attribute changes of said first and second signals to determine said relative attribute difference.

17. The method of claim 15, wherein said determining step comprises the steps of:

comparing a sample of said first signal with a sample of said second signal to determine said relative attribute difference.

18. The method of claim 15, wherein said controlling step comprises the step of:

adjusting the amplitude of a signal combined in-phase and quadrature to provide a desired phase shift in said first signal.

19. The method of claim 14, wherein said multiple ones of said discrete portions of signal path said known signal is introduced into includes signal paths of a second set of said at least two sets.

20. The method of claim 19, wherein said sampling step comprises the steps of:

combining signals sampled from the discrete portions of signal path associated with said first set of signals into a first common signal;

combining signals sampled from the discrete portions of signal path associated with said second set of signals into a second common signal;

controlling a selection circuit providing switchable communication of said first and second common signal to a signal attribute detector operable in said determining step, wherein said first common signal is communicated to said attribute detector.

21. The method of claim 20, further comprising the steps of:

interrupting ones of said discrete portions of signal path of said first set of signals, wherein a single signal of said first set is available for sampling at said sampling step at any one time.

22. The method of claim 20, wherein said interrupting step does not interrupt said discrete portions of signal path of said second set of signals when interrupting said ones of said first set of signals.

23. The method of claim 14, wherein said particular signal attribute is a phase of said first signal.

24. The method of claim 14, wherein said particular signal attribute is an amplitude of said first signal.

25. A phased array antenna system having a plurality of individual antennas arranged to simultaneously broadcast a signal such that the phase relationship of the signal as it appears at each such individual antenna determines the coverage area of the resultant signal, wherein said phased array is adapted to provide self-contained tuning of the phase of said signal as it appears at each individual antenna to maintain said phase relationship, said system comprising:

means for communicating to each such individual antenna the signal having a desired phase;

means for monitoring the phase of the signal actually received at each such antenna; and means controlled by said monitoring means for adjusting the phase of each such communicated signal until the desired phase is monitored as having been actually received at each said antenna.

26. The system of claim 25, wherein said monitoring means comprises:

means for restricting communication of the signal to a first selected antenna of said individual antennas at a first time and for restricting communication of the signal to a second selected antenna of said individual antennas at a second time; and means including a common signal path for accepting the monitored phase of the signal as actually received at said first antenna during said first time and for accepting the monitored phase of the signal as actually received at said second antenna during said second time.

27. The system of claim 26, wherein said monitoring means further comprises:

means for comparing the phase of the signal as actually received at said first antenna during said first time to the phase of the signal as actually received at said second antenna during said second time, wherein said comparison is utilized in control of said adjusting means.

28. The system of claim 27, wherein said comparing means comprises:

means for comparing a monitored signal as actually received at said first antenna during said first time to said signal as actually transmitted, wherein said phase of the signal as actually received at said first antenna is determined; and means for comparing a monitored signal as actually received at said second antenna during said second time to said signal as actually transmitted, wherein said phase of the signal as actually received at said second antenna is determined.

29. A method of providing self-contained tuning of a phased array antenna system having a plurality of individual antennas arranged to simultaneously broadcast a signal such that the phase relationship of the signal as it appears at each such individual antenna determines the coverage area of the resultant signal, said method comprising the steps of:

communicating the signal having a desired phase to a plurality of individual antennas of the phased array;

monitoring the phase of the signal actually received at each of said plurality of individual antennas; and adjusting through reference to said monitored phase the phase of each such communicated signal until the desired phase is monitored as having been actually received at ones of said plurality of antennas.

30. The method of claim 29, wherein said monitoring step comprises the steps of:

restricting communication of the signal to a first selected antenna of said plurality of antennas at a first time and for restricting communication of the signal to a second selected antenna of said plurality of antennas at a second time; and accepting through a common signal path the monitored phase of the signal as actually received at said first antenna during said first time and the monitored phase of the signal as actually received at said second antenna during said second time.

31. The method of claim 30, wherein said monitoring step further comprises the step of:

comparing the phase of the signal as actually received at said first antenna during said first time to the phase of the signal as actually received at said second antenna during said second time, wherein said reference to said monitored phase includes reference to said comparison.

32. The method of claim 31, wherein said comparing step comprises the steps of:

comparing a monitored signal as actually received at said first antenna during said first time to said signal as actually transmitted, wherein said phase of the signal as actually received at said first antenna is determined; and comparing a monitored signal as actually received at said second antenna during said second time to said signal as actually transmitted, wherein said phase of the signal as actually received at said second antenna is determined.

33. An apparatus for adjusting a phase relationship between at least two signals simulcast from a communication system having a plurality of antenna interfaces distinguishable as at least a first set and a second set of antenna interfaces, wherein said communication system provides a first signal of said at least two signals and a second signal of said at least two signals to individual antenna interfaces of said first set of antenna interfaces, said apparatus comprising:

a calibration signal generator coupled to said communication system, wherein a calibration signal is controllably introduced into said communication system for provision to ones of said plurality of antenna interfaces;

a plurality of combiners coupled to said plurality of antenna interfaces, wherein a first combiner of said plurality combines signals from said first set of antenna interfaces and a second combiner of said plurality combines signals from said second set of antenna interfaces;

a switch matrix coupled said plurality of combiners, wherein a signal associated with a set of antenna interfaces may be switchably selected to the exclusion of signals associated with other sets of antenna interfaces;

a phase detector coupled to said switch matrix and accepting said signal of said selected set of antenna interfaces, wherein said phase detector is also coupled to said calibration signal generator and accepts said calibration signal, and wherein said phase detector determines a phase difference between said accepted antenna set signal and said accepted calibration signal and;

a processor based controller coupled to said phase detector and accepting said determination of said phase difference, said controller also coupled to said switch matrix and providing control of said switch matrix to select a particular said signal of said sets of antenna interfaces, said controller also coupled to said communication system and controlling phase adjustment of ones of said at least two signals in response to said determination of said phase difference.

34. The apparatus of claim 33, wherein said controller provides control of said communication system to provide said calibration signal at said first set of antenna interfaces one antenna interface at a time, wherein said first combiner provides substantially only said calibration signal associated with said one antenna interface to said switch matrix at any one time.

35. The apparatus of claim 34, wherein said controller provides control of said communication system to provide said calibration signal at each of said antenna interfaces of said second set of antenna interfaces, wherein said calibration signal provided by said first combiner includes effects of cross coupling from said calibration signal of said second set of antenna interfaces introduced by said communication system.

36. The apparatus of claim 33, wherein said combiners are coupled to said antenna interfaces to sample said calibration signal without interrupting communication of signals to an antenna.

37. The apparatus of claim 33, wherein said calibration signal generator is coupled to said communication system to introduce said calibration signal without interrupting communication of a signal of said communication system.

38. The apparatus of claim 33, wherein said calibration signal generator is switchably coupled to said communication to provide switchable selection of said calibration signal and a signal of said communication system, wherein contrail of said switchable connection is provided by said controller.

39. A system for calibrating a particular signal attribute of a first signal of a plurality of signals, said calibrated signal attribute of said first signal having a predetermined relationship to other ones of said plurality of signals, said system comprising:

means for introducing a known signal into a communication system having at least a discrete portion of a signal path associated with each of said plurality of signals, wherein said known signal is provided to multiple ones of said discrete portions of signal path;

means for sampling said known signal at the discrete portion of signal path associated with said first signal and at the discrete portion of signal path associated with said other ones of said plurality of signals;

means for determining a relationship of said particular attribute of said first signal with respect to said particular attribute of said other ones of said plurality of signals;

means utilizing said determined relationship for adjusting circuitry disposed in said discrete portion of signal path associated with said first signal to provide said predetermined relationship of said first signal with respect to said other ones of said plurality of signals; and wherein said determining means comprises:

means for comparing samples of said known signal with an exemplary of said known signal;

means for determining said particular signal attribute change between each of said compared samples of said known signal and said exemplary of said known signal; and means for comparing said determined changes to determine said relationship of said particular attribute of said first signal with respect to said particular attribute of said other ones of said plurality of signals.

40. A system for calibrating a particular signal attribute of a first signal of a plurality of signals, said calibrated signal attribute of said first signal having a predetermined relationship to other ones of said plurality of signals, said system comprising:

means for introducing a known signal into a communication system having at least a discrete portion of a signal path associated with each of said plurality of signals, wherein said known signal is provided to multiple ones of said discrete portions of signal path;

means for sampling said known signal at the discrete portion of signal path associated with said first signal and at the discrete portion of signal path associated with said other ones of said plurality of signals;

means for determining a relationship of said particular attribute of said first signal with respect to said particular attribute of said other ones of said plurality of signals;

means utilizing said determined relationship for adjusting circuitry disposed in said discrete portion of signal path associated with said first signal to provide said predetermined relationship of said first signal with respect to said other ones of said plurality of signals; and wherein said adjusting means comprises: processor based means for controlling said circuitry, wherein said controlling means comprises:

a control signal interface coupled to said circuitry; and a control signal interface coupled to a selection circuit, said selection circuit coupled between said sampling means and said determining means and providing selection between groups of sampled known signals, wherein said first signal and said other ones of said plurality of signals are included in a same first group of said groups.

41. The system of claim 40, wherein said circuitry provides selective interruption of ones of said discrete portion of signal paths, and wherein said circuitry allows a single signal of said first group to pass at a time under control of said controlling means.

42. The system of claim 41, wherein said circuitry allows signals of said plurality of signals of a second group of said groups to pass simultaneously with allowing said single signal of said first group to pass.

43. The system of claim 42, wherein said sampling means comprises:

means for combining signals of said first group of said groups, wherein a single signal path is provided from said combining means to said determining means.

* * * * *